US011588517B2

(12) United States Patent
Guo et al.

(10) Patent No.: US 11,588,517 B2
(45) Date of Patent: Feb. 21, 2023

(54) SIGNAL CORRECTION FOR SERIAL INTERFACES

(71) Applicant: Diodes Incorporated, Milpitas, CA (US)

(72) Inventors: ZhangQi Jason Guo, Fremont, CA (US); Xin Mao, Yangzhou (CN); Michael Y. Zhang, Palo Alto, CA (US)

(73) Assignee: Diodes Incorporated, Plano, TX (US)

( * ) Notice: Subject to any disclaimer, the term of this patent is extended or adjusted under 35 U.S.C. 154(b) by 140 days.

(21) Appl. No.: 17/248,446

(22) Filed: Jan. 25, 2021

(65) Prior Publication Data

US 2022/0239334 A1 Jul. 28, 2022

(51) Int. Cl.
| | |
|---|---|
| *G06F 13/40* | (2006.01) |
| *H04B 3/32* | (2006.01) |
| *H04B 3/56* | (2006.01) |
| *H04B 3/54* | (2006.01) |
| *H04B 3/30* | (2006.01) |

(52) U.S. Cl.
CPC ............. *H04B 3/32* (2013.01); *H04B 3/30* (2013.01); *H04B 3/548* (2013.01); *H04B 3/56* (2013.01)

(58) Field of Classification Search
CPC ... H04B 3/30; H04B 3/32; H04B 3/54; H04B 3/548; H04B 3/56; H04B 17/02; G06F 13/42; H04J 3/08; H04L 5/04; H04L 5/1407; H04L 5/1423; H04L 5/16; H04L 25/22; H04L 43/50
See application file for complete search history.

(56) References Cited

U.S. PATENT DOCUMENTS

| | | | | |
|---|---|---|---|---|
| 6,363,085 | B1* | 3/2002 | Samuels | G06F 13/4045 |
| | | | | 370/242 |
| 9,727,514 | B2* | 8/2017 | Ma | G06F 13/385 |
| 9,800,235 | B2 | 10/2017 | Tang et al. | |
| 9,836,420 | B2* | 12/2017 | Kang | G06F 13/387 |
| 10,425,124 | B1* | 9/2019 | Wang | H04B 3/36 |
| 2009/0063717 | A1* | 3/2009 | Bohm | G06F 13/4045 |
| | | | | 710/8 |
| 2014/0006663 | A1* | 1/2014 | Chen | G06F 1/3253 |
| | | | | 710/106 |
| 2015/0363350 | A1* | 12/2015 | Yeung | G06F 13/4221 |
| | | | | 710/106 |
| 2019/0288743 | A1* | 9/2019 | Wang | H04L 25/24 |

OTHER PUBLICATIONS

Apple Inc. et al., Embedded USB2 (eUSB2) Physical Layer Supplement to [USB2.0] Specification—Rev 1.1, 158 pages, 2018.*

* cited by examiner

*Primary Examiner* — Frank Duong
(74) *Attorney, Agent, or Firm* — Weaver Austin Villeneuve & Sampson LLP; John Griffith; Steven A. Shaw

(57) ABSTRACT

Signal correction circuitry is described that improves the integrity of data transmitted over a serial data interface without interrupting the communication between the connected devices. The signal correction circuitry includes edge correction circuitry that speeds up the rising and falling edges of the data signal(s). The signal correction circuitry also includes DC compensation circuitry that boosts the level(s) of the data signal(s).

19 Claims, 4 Drawing Sheets

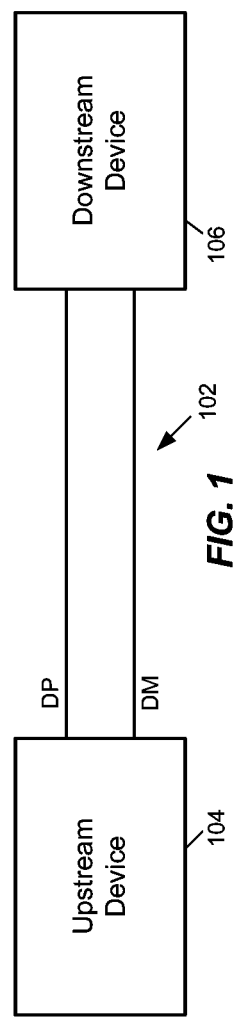
FIG. 1
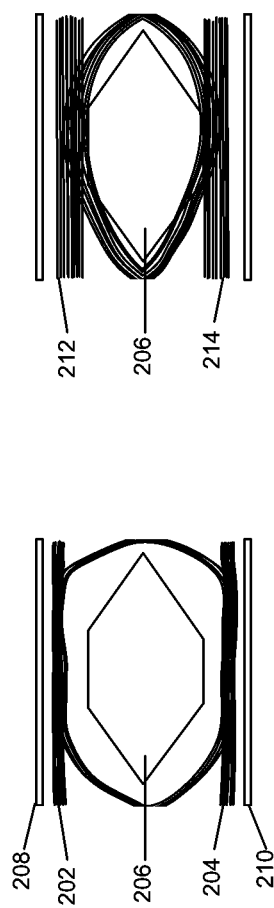
FIG. 2A
FIG. 2B
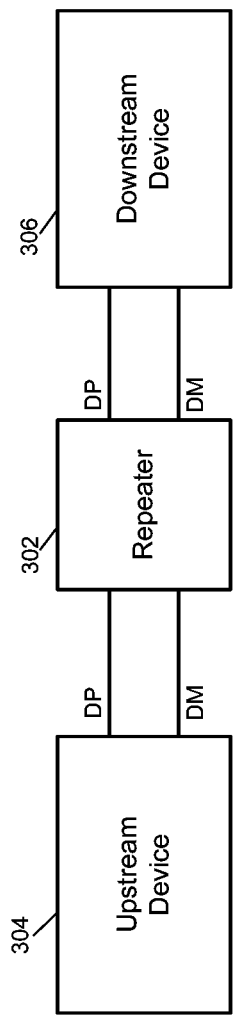
FIG. 3

SIGNAL CORRECTION FOR SERIAL INTERFACES

BACKGROUND

There are a variety of transmission protocols used to transmit serial data between connected devices. Examples of such protocols include the DisplayPort standard, the High-Definition Multimedia Interface (HDMI) standard, the Serial ATA standard, the Peripheral Component Interconnect Express (PCI-E) standard, the Universal Serial Bus (USB) standard, the Hypertransport protocol, Infiniband protocol, the XAUI protocol, and the Ethernet protocol. Each of these protocols has evolved over time to include multiple generations and, at least for some, multiple versions within each generation. Serial interfaces may be implemented according to any of these standards using either single-ended or differential signaling. An example of such a serial interface is shown in FIG. 1.

Serial interface 102 connects an upstream device 104 to a downstream device 106 and is implemented using differential signaling in which the serial data are represented using signal lines of opposite polarity designated DP and DM. Although many serial interfaces are bi-directional, interface 102 is depicted as being uni-directional for simplicity. As is well known, the integrity of the signals transmitted via such an interface degrades as the frequency or data rate of the signals and/or the length of the transmission lines increase. This may be understood with reference to FIGS. 2A and 2B.

FIGS. 2A and 2B are representations of an "eye mask compliance" test in which multiple, one unit interval (UI) signal captures (the equivalent of one clock cycle) of a serial data stream (e.g., signals on signal lines DP and DM) are superimposed. FIG. 2A illustrates passage of the test in which the signals 202 and 204 do not violate the boundaries of the failure zones (masks) in the middle of the eye (206) and above and below the eye (208 and 210). This might be the case, for example, for an interface that includes very short transmission lines. FIG. 2B, on the other hand, illustrates a failure of the test in which signals 212 and 214 violate the boundaries of mask 206. This signal degradation might occur, for example, where the signal lines of the interface are too long for the frequency or data rate of the serial data signals.

The problem of signal degradation over serial interfaces is typically handled by the introduction of one or more repeaters between the connected devices. See, for example, repeater 302 between connected devices 304 and 306 of FIG. 3. Repeaters (e.g., re-drivers or re-timers) are devices that restore signal integrity as the data are being transmitted between connected devices. Repeaters may include components such as receivers, equalizers, and transmitters, and may require complex detection control, interrupting the communication between the connected devices, introducing undesirable delay, and resulting in additional power consumption and system cost.

SUMMARY

According to a particular class of implementations, a circuit includes an interface configured for connection in parallel with a differential transmission line. The differential transmission line includes a first signal line and a second signal line. Edge correction circuitry is configured to detect a signal crossover on the first and second signal lines and, in response to detection of the signal crossover, pull one of the first and second signal lines up to a first voltage reference for a predetermined period of time and pull the other of the first and second signal lines down to a second voltage reference for the predetermined period of time. Level correction circuitry is configured to boost a signal level on the one of the first and second signal lines pulled up to the first voltage reference by a predetermined amount after the predetermined period of time and for at least one bit duration.

According to a particular implementation, the differential transmission line is configured to operate according to a serial data transmission protocol. The serial data transmission protocol has a first mode of operation corresponding to a first operating speed and a second mode of operation corresponding to a second operating speed. The circuit includes enable circuitry configured to enable the edge correction circuitry and the level correction circuitry if the differential transmission line is configured for the first mode of operation and to disable the edge correction circuitry and the level correction circuitry if the differential transmission line is configured for the second mode of operation.

According to a more specific implementation, the serial data transmission protocol is the Universal Serial Bus (USB) 2.0 protocol, and the first mode of operation is high speed operation.

According to another more specific implementation, the enable circuitry is configured to detect whether the differential transmission line is operating in the first mode or the second mode, and, if the differential transmission line is operating in the first mode, to generate an enable signal. According to an even more specific implementation, the enable circuitry is configured to detect whether the differential transmission line is operating in the first mode or the second mode with reference to one or more signals associated with training of the differential transmission line or with reference to serial data transmitted over the differential transmission line.

According to another more specific implementation, the interface provides overvoltage protection during the second mode of operation.

According to another particular implementation of this class of implementations, the predetermined period of time is configurable.

According to another particular implementation, the predetermined amount is configurable.

According to still another particular implementation, the level correction circuitry is configured to boost the signal level on the one of the first and second signal lines pulled up to the first voltage reference until a subsequent signal crossover is detected.

According to another class of implementations, a transmission line includes a first signal line and a second signal line. Edge correction circuitry is configured to detect a signal crossover on the first and second signal lines and, in response to detection of the signal crossover, pull one of the first and second signal lines up to a first voltage reference for a predetermined period of time and pull the other of the first and second signal lines down to a second voltage reference for the predetermined period of time. Level correction circuitry is configured to boost a signal level on the one of the first and second signal lines pulled up to the first voltage reference by a predetermined amount after the predetermined period of time and for at least one bit duration. Neither the edge correction circuitry nor the level correction circuitry interrupts data transmission on the first and second signal lines.

According to a particular implementation, the transmission line is configured to operate according to a serial data transmission protocol. The serial data transmission protocol has a first mode of operation corresponding to a first operating speed and a second mode of operation corresponding to a second operating speed. The transmission line includes enable circuitry configured to enable the edge correction circuitry and the level correction circuitry if the transmission line is configured for the first mode of operation and to disable the edge correction circuitry and the level correction circuitry if the transmission line is configured for the second mode of operation.

According to a more specific implementation, the serial data transmission protocol is the Universal Serial Bus (USB) 2.0 protocol, and wherein the first mode of operation is high speed operation.

According to another more specific implementation, the enable circuitry is configured to detect whether the transmission line is operating in the first mode or the second mode, and, if the transmission line is operating in the first mode, to generate an enable signal. According to an even more specific implementation, the enable circuitry is configured to detect whether the transmission line is operating in the first mode or the second mode with reference to one or more signals associated with training of the transmission line or with reference to serial data transmitted over the transmission line.

According to another more specific implementation, overvoltage protection circuitry is configured to provide overvoltage protection during the second mode of operation.

According to another particular implementation of this class of implementations, the predetermined period of time is configurable.

According to another particular implementation, the predetermined amount is configurable.

According to another particular implementation, the level correction circuitry is configured to boost the signal level on the one of the first and second signal lines pulled up to the first voltage reference until a subsequent signal crossover is detected.

According to another particular implementation, the transmission line includes at least one additional instance of the edge correction circuitry and at least one additional instance of the level correction circuitry.

A further understanding of the nature and advantages of various implementations may be realized by reference to the remaining portions of the specification and the drawings.

BRIEF DESCRIPTION OF THE DRAWINGS

FIG. 1 depicts two devices connected by a differential transmission line.

FIGS. 2A and 2B illustrate passage and failure, respectively, of an eye mask compliance test.

FIG. 3 depicts two devices connected by multiple differential transmission lines and an intervening repeater.

DETAILED DESCRIPTION

Reference will now be made in detail to specific implementations. Examples of these implementations are illustrated in the accompanying drawings. It should be noted that these examples are described for illustrative purposes and are not intended to limit the scope of this disclosure. Rather, alternatives, modifications, and equivalents of the described implementations are included within the scope of this disclosure as defined by the appended claims. In addition, specific details may be provided in order to promote a thorough understanding of the described implementations. Some implementations within the scope of this disclosure may be practiced without some or all of these details. Further, well known features may not have been described in detail for the sake of clarity.

The present disclosure describes signal correction circuitry that improves the integrity of data transmitted over a serial data interface without interrupting the communication between the connected devices. According to some implementations, the signal correction circuitry includes edge correction circuitry that speeds up the rising and falling edges of the data signal(s). According to some implementations, the signal correction circuitry also includes DC compensation circuitry that boosts the level(s) of the data signal(s). An example will be instructive.

Figure 4:
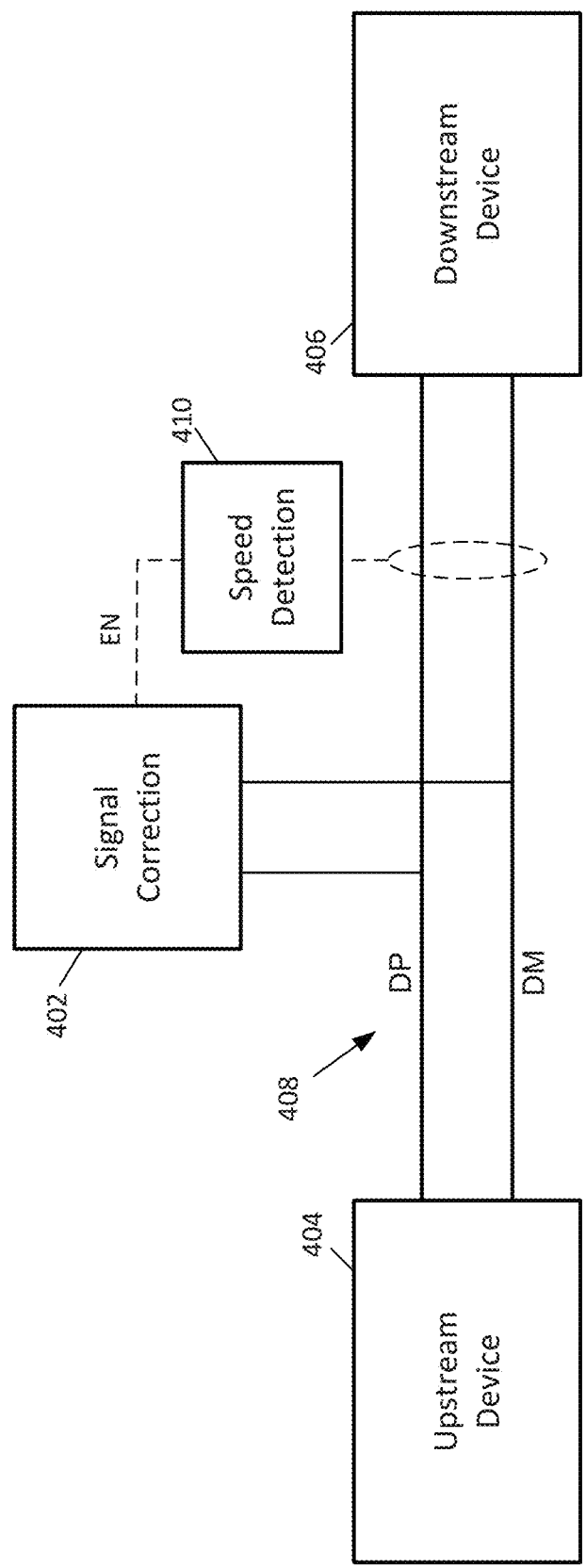
FIG. 4 depicts two devices connected by a differential transmission line with associated signal correction circuitry enabled by the present disclosure.

FIG. 4 is a simplified block diagram of a system in which signal correction circuitry 402 improves the integrity of data transmitted between upstream device 404 and downstream device 406 via serial interface 408. In contrast to the insertion of a repeater as depicted in FIG. 3, the connections of data transmission lines DP and DM to signal correction circuitry 402 place the signal correction circuitry effectively in parallel with the serial interface, allowing transmission lines DP and DM to remain continuous between the connected devices and therefore not interrupting the data signals in the same way as a repeater.

It should be noted that, depending on the length and/or characteristics of the transmission line(s) of the interface, a single instance of such signal correction circuitry may not be sufficient to maintain signal integrity. Therefore, implementations are contemplated in which more than one instance of signal correction circuitry as enabled by the present disclosure may be integrated at different points along the transmission line(s) of an interface.

As will be discussed, one class of implementations relates to serial interfaces implemented according to USB 2.0. However, it should be noted that implementations are contemplated for other generations and/or versions of USB, as well as any of a number of other serial data protocols including, for example, the DisplayPort protocol, the HDMI protocol, the Serial ATA protocol, the PCI-E protocol, the Hypertransport protocol, Infiniband protocol, the XAUI protocol, and the Ethernet protocol, any of the various versions thereof.

It should also be noted that there are a variety of differential signaling protocols with which implementations enabled by the present disclosure may be used including, for example, differential Stub-Series Terminated Logic (SSTL), differential High-Speed Transceiver Logic (HSTL), Low-Voltage Differential Signaling (LVDS), differential Low-Voltage Positive Emitter Coupled Logic (LVPECL), and Reduced Swing Differential Signaling (RSDS) among other differential digital signaling protocols. Additionally, implementations are contemplated that use single-ended serial interface protocols such as, for example, Low Voltage Transistor-Transistor Logic (LVTTL) such as used for PCI, and Low Voltage Complementary Metal Oxide Semiconductor (LVCMOS), among other single-ended serial interface protocols. However, for purposes of clarity and not limitation, it shall be assumed that differential signaling is used.

Referring back to FIG. 4, implementations are contemplated in which signal correction circuitry 402 may not be needed for all operational modes of transmission line 408. For example, a particular version of a serial data protocol might have multiple operational modes characterized by different data rates. And it might be the case that transmission line 408 passes the eye mask compliance test for one or more lower data rates but not for one or more higher data rates. In such an implementation, it may be useful to have the capability of enabling and disabling signal correction circuitry 402 based on the mode of operation.

Therefore, according to some implementations, speed detection logic 410 detects the data rate to be used for transmission of data between devices 404 and 406 and, depending on the detected rate, asserts or de-asserts an enable signal EN. According to a particular implementation, the data rate may be detected by logic 410 "snooping" or "listening" to the handshaking signals between the connected devices during link training. However, it should be noted that other information might be used. For example, the data rate of the incoming data itself might be detected. In another example, the magnitude or swing of the data signal(s) may be used (possibly in conjunction with handshake listening). More generally, any information that may be used to identify mode of operation and/or the data rate with which the connected devices are communicating may be used for this purpose.

It should also be noted that FIG. 4 only shows the downstream transmission path from device 404 to device 406. However, it will be understood that an upstream transmission path may include substantially identical circuitry for transmission of serial data from device 406 to device 404. According to some implementations, logic 410 may be integrated with the signal correction circuitry 402. Alternatively, logic 410 may be implemented separately from circuitry 402. Moreover, signal correction circuitry 402 and/or logic 410 may be integrated with serial interface 408 to varying degrees.

According to a particular class of implementations in which serial data interface 408 is a USB 2.0 interface, signal correction circuitry 402 is configured to be disabled for low and full speed operation of interface 408 (i.e., having maximum data rates of 1.5 and 12 megabits per second, respectively) and enabled for high speed operation (i.e., having a maximum data rate of 480 megabits per second). A particular implementation of signal correction circuitry suitable for use in such implementations is shown in FIG. 5.

Figure 5:
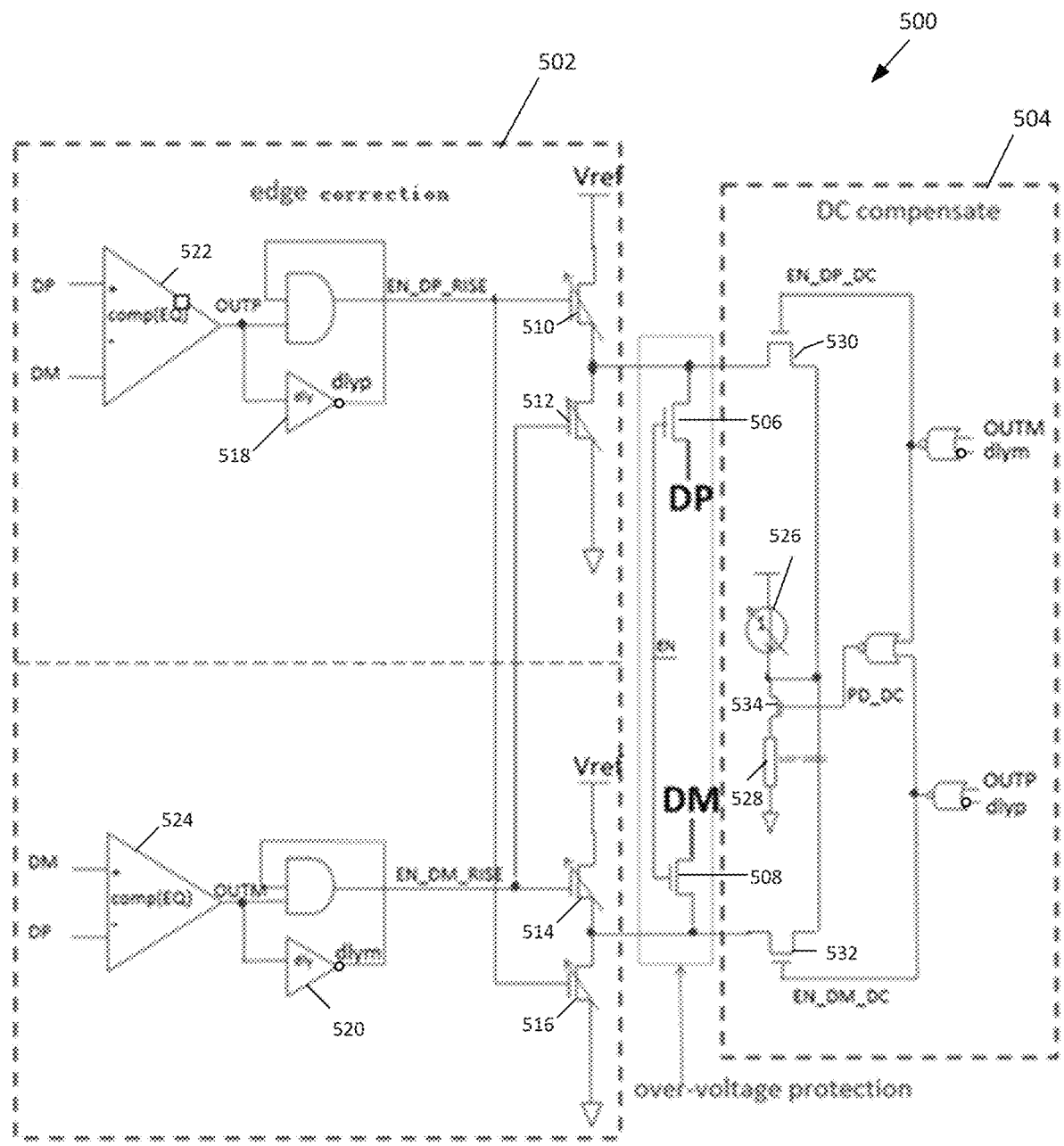
FIG. 5 is a simplified schematic diagram of a particular implementation of signal correction circuitry enabled by the present disclosure.

Signal correction circuitry 500 of FIG. 5 includes edge correction circuitry 502 and DC compensation circuitry 504. As will be discussed, when enable signal EN is asserted (e.g., high) differential signal lines DP and DM are connected to circuitry 502 and 504 via input switches 506 and 508. Switches 506 and 508 also provide overvoltage protection from the higher voltages on DP and DM during low and full speed operation (during which there is no signal correction).

Edge correction circuitry 502 speeds up the rise and fall times of the signals on DP and DM by pulling the signals up or down to corresponding reference voltages shown in the depicted example as Vref and ground. The signal on DP is pulled up or down via switch 506 and one or the other of switches 510 and 512. Similarly, the signal on DM is pulled up or down via switch 508 and one or the other of switches 514 and 516. Depending on the application in which the serial interface is deployed, different reference voltages may be used. The reference voltage(s) (which may be independent of other system voltages) may be configured when the serial interface is installed. The suitable range of configurability of the reference voltage(s) will depend on the generation and/or version of the serial data protocol and the application in which the interface is installed. An example of a suitable range for Vref in the context of USB 2.0 is about 0.4-0.6 volts.

The signal correction by edge correction circuitry 502 is provided for a configurable period of time (e.g., less than one UI) after which signal correction by DC compensation circuitry 504 takes over. The correction by DC compensation circuitry 504 ensures that the signal levels on DP and DM remain sufficiently high regardless of the number of UIs the signals remain in a given state. The amount of the boost provided by circuitry 504 may be configured when the serial interface is installed, e.g., based on actual loss measured. The suitable range of configurability will depend on the generation and/or version of the serial data protocol and the application in which the interface is installed. An example of a suitable range in the context of USB 2.0 is 0 to 100 mV, e.g., in 20 mV steps.

The period of time during which edge correction circuitry 502 operates is determined by delay elements 518 and 520 and may be configured when the serial interface is installed. The suitable range of configurability of the delay will depend on the generation and/or version of the serial data protocol, the application in which the interface is installed, and the typical bit or UI duration (e.g., the delay can correspond to a specific portion of a bit or UI duration). An example of a suitable range of delay times in the context of USB 2.0 is about 0.5-1.0 ns. Typically, the delays introduced by delay elements 518 and 520 would be the same. However, implementations are contemplated in which they might be different. For example, if losses introduced by DP and DM are different, different delays might be introduced to account for that.

Figure 6:
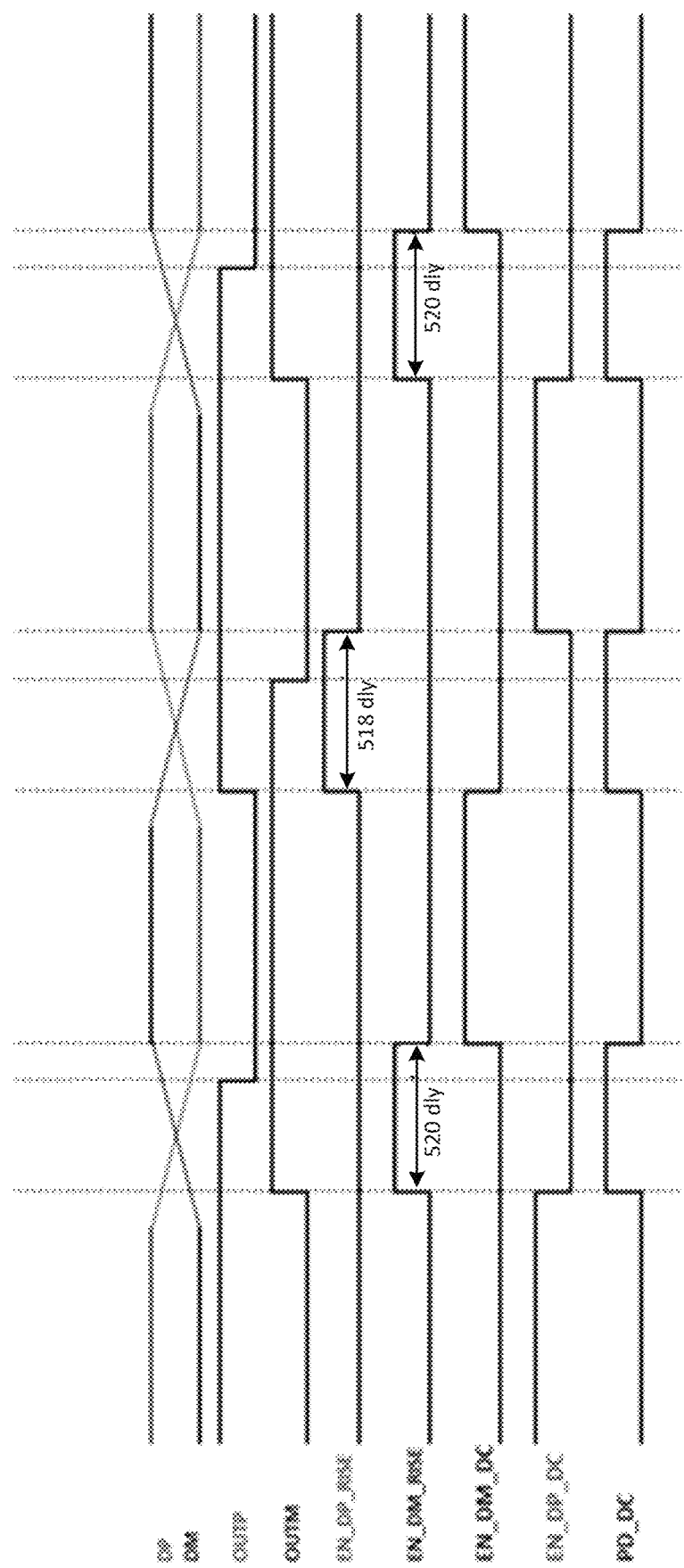
FIG. 6 is a timing diagram illustrating operation of a particular implementation of signal correction circuitry enabled by the present disclosure.

A more detailed description of the operation of signal correction circuitry 500 will now be provided with reference to the signal timing diagram of FIG. 6. Comparators 522 and 524 (which may be differential receivers that include equalization) detect when the signals on DP and DM cross, thereby indicating a transition in the differential signal. This results in the assertion of either EN_DP_RISE or EN_DM_RISE (depending on which signal is rising) for the time during which dlym or dlyp remains asserted (520 dly or 518 dly as determined by delay elements 520 and 518, respectively). As can be seen, the assertion of EN_DP_RISE results in DP being pulled up to Vref (via switch 510) and DM being pulled down to ground (via switch 516). Similarly the assertion of EN_DM_RISE results in DM being pulled up to Vref (via switch 514) and DP being pulled down to ground (via switch 512). As mentioned above, the assertion of either signal is temporary as determined by the delay element associated with the other half of the edge correction circuitry 502.

According to a particular implementation and as illustrated by the timing diagram of FIG. 6, comparators 522 and 524 are configured with offsets such that the crossover of the signals on DP and DM is detected early. This compensates for the delay associated with the comparators themselves. For example, if the delay of the comparator is 1 ns, the offset for each of the comparators may be set such that the output of the comparator (e.g., OUTP or OUTM) switches 0.3 ns before the signals actually cross.

After the delay determined by either delay element 518 or 520 (depending on which signal is rising), whichever one of EN_DP_RISE or EN_DM_RISE that was asserted is de-asserted, thereby disabling edge correction circuitry 502. DC compensation circuitry 504 is then enabled, providing a configurable voltage boost by connecting either DP or DM (depending on which pair of signals OUTP/dlyp or OUTM/dlym are both asserted) to current source 526 via switch 530 or switch 532 (both n-channel devices). For example, if both OUTP and dlyp are asserted (and thus the signal on DP has been asserted sufficiently long), EN_DP_DC is de-asserted turning on switch 530. Similarly, if both OUTM and dlym are asserted, EN_DM_DC is de-asserted turning on switch 532. When the signals on DP and DM are transitioning, both EN_DP_DC and EN_DM_DC are asserted and current source 526 is not connected to either DP or DM, instead sending its current through switch 534 and resistance 528 to ground, i.e., signal correction by DC compensation circuitry 504 is disabled in favor of the signal correction by edge correction circuitry 502.

As mentioned above, the voltage boost provided by current source 526 may be configurable to suit the particular application. And as will be understood with reference to FIGS. 5 and 6 and the foregoing description, once DC compensation circuitry 504 is enabled, it will continue to provide its voltage boost to one or the other of DP or DM until the next signal transition.

As will be appreciated by those of skill in the art, signal correction circuitry enabled by the present disclosure may be implemented to consume considerably less power than typical repeaters and without interrupting signal transmissions between connected devices.

Various implementations described herein may be implemented using any of a variety of standard or proprietary CMOS processes. In addition, it should be noted that implementations are contemplated that may employ a much wider range of semiconductor materials and manufacturing processes including, for example, GaAs, SiGe, etc. Signal correction circuitry as described herein may be represented (without limitation) in software (object code or machine code in non-transitory computer-readable media), in varying stages of compilation, as one or more netlists (e.g., a SPICE netlist), in a simulation language, in a hardware description language (e.g., Verilog, VHDL), by a set of semiconductor processing masks, and as partially or completely realized semiconductor devices (e.g., an ASIC). Some implementations may be a standalone integrated circuit, while others may be integrated with the associated serial interface.

It will be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

What is claimed is:

1. A circuit, comprising:
    an interface configured for connection in parallel with a differential transmission line, the differential transmission line including a first signal line and a second signal line;
    edge correction circuitry configured to detect a signal crossover on the first and second signal lines and, in response to detection of the signal crossover, pull one of the first and second signal lines up to a first voltage reference for a predetermined period of time and pull the other of the first and second signal lines down to a second voltage reference for the predetermined period of time;
    level correction circuitry configured to boost a signal level on the one of the first and second signal lines pulled up to the first voltage reference by a predetermined amount after the predetermined period of time and for at least one bit duration; and
    enable circuitry configured to enable and disable the edge correction circuitry and the level correction circuitry.

2. The circuit of claim 1, wherein the differential transmission line is configured to operate according to a serial data transmission protocol, the serial data transmission protocol having a first mode of operation corresponding to a first operating speed and a second mode of operation corresponding to a second operating speed, and wherein the enable circuitry is configured to enable the edge correction circuitry and the level correction circuitry if the differential transmission line is configured for the first mode of operation and to disable the edge correction circuitry and the level correction circuitry if the differential transmission line is configured for the second mode of operation.

3. The circuit of claim 2, wherein the serial data transmission protocol is the Universal Serial Bus (USB) 2.0 protocol, and wherein the first mode of operation is high speed operation.

4. The circuit of claim 2, wherein the enable circuitry is configured to detect whether the differential transmission line is operating in the first mode or the second mode, and, if the differential transmission line is operating in the first mode, to generate an enable signal.

5. The circuit of claim 4, wherein the enable circuitry is configured to detect whether the differential transmission line is operating in the first mode or the second mode with reference to one or more signals associated with training of the differential transmission line or with reference to serial data transmitted over the differential transmission line.

6. The circuit of claim 2, wherein the interface provides overvoltage protection during the second mode of operation.

7. The circuit of claim 1, wherein the predetermined period of time is configurable.

8. The circuit of claim 1, wherein the predetermined amount is configurable.

9. The circuit of claim 1, wherein the level correction circuitry is configured to boost the signal level on the one of the first and second signal lines pulled up to the first voltage reference until a subsequent signal crossover is detected.

10. A transmission line system, comprising:
    a first signal line and a second signal line;
    edge correction circuitry configured to detect a signal crossover on the first and second signal lines and, in response to detection of the signal crossover, pull one of the first and second signal lines up to a first voltage reference for a predetermined period of time and pull the other of the first and second signal lines down to a second voltage reference for the predetermined period of time;
    level correction circuitry configured to boost a signal level on the one of the first and second signal lines pulled up to the first voltage reference by a predetermined amount after the predetermined period of time and for at least one bit duration; and
    enable circuitry configured to enable and disable the edge correction circuitry and the level correction circuitry;
    wherein neither the edge correction circuitry nor the level correction circuitry interrupts data transmission on the first and second signal lines.

11. The system of claim 10, wherein the system is configured to operate according to a serial data transmission protocol, the serial data transmission protocol having a first mode of operation corresponding to a first operating speed and a second mode of operation corresponding to a second operating speed, and wherein the enable circuitry is configured to enable the edge correction circuitry and the level correction circuitry if the system is configured for the first mode of operation and to disable the edge correction circuitry and the level correction circuitry if the system is configured for the second mode of operation.

12. The system of claim 11, wherein the serial data transmission protocol is the Universal Serial Bus (USB) 2.0 protocol, and wherein the first mode of operation is high speed operation.

13. The system of claim 11, wherein the enable circuitry is configured to detect whether the system is operating in the first mode or the second mode, and, if the system is operating in the first mode, to generate an enable signal.

14. The system of claim 13, wherein the enable circuitry is configured to detect whether the system is operating in the first mode or the second mode with reference to one or more signals associated with training of the system or with reference to serial data transmitted over the system.

15. The system of claim 11, further comprising overvoltage protection circuitry configured to provide overvoltage protection during the second mode of operation.

16. The system of claim 10, wherein the predetermined period of time is configurable.

17. The system of claim 10, wherein the predetermined amount is configurable.

18. The system of claim 10, wherein the level correction circuitry is configured to boost the signal level on the one of the first and second signal lines pulled up to the first voltage reference until a subsequent signal crossover is detected.

19. The system of claim 10, further comprising at least one additional instance of the edge correction circuitry and at least one additional instance of the level correction circuitry.

* * * * *